US 6,739,521 B2

(12) United States Patent
Bandemer et al.

(10) Patent No.: US 6,739,521 B2
(45) Date of Patent: May 25, 2004

(54) HEADLIGHT CLEANING SYSTEM OPERATING EXCLUSIVELY BY SPRAYING WITH WASHING LIQUID (75) Inventors: Joachim Bandemer, Nidderau (DE); Rainer Kober, Darmstadt (DE); Torsten Hahn, Homberg/Efze (DE)

(73) Assignee: Mannesman VDO AG, Frankfurt (DE)

( * ) Notice: Subject to any disclaimer, the term of this patent is extended or adjusted under 35 U.S.C. 154(b) by 0 days.

(21) Appl. No.: 09/308,314

(22) PCT Filed: Oct. 6, 1997

(86) PCT No.: PCT/EP97/05478

§ 371 (c)(1),
(2), (4) Date: May 13, 1999

(87) PCT Pub. No.: WO98/21076

PCT Pub. Date: May 22, 1998

(65) Prior Publication Data

US 2002/0060254 A1 May 23, 2002

(30) Foreign Application Priority Data

Nov. 14, 1996 (DE) .......................... 196 46 972

(51) Int. Cl.⁷ ................ B60S 1/56; B60S 1/46
(52) U.S. Cl. ................ 239/284.2; 15/250.002; 15/250.04; 239/281
(58) Field of Search ............. 15/250.002, 250.01, 15/250.04, 250.003, 250.29; 239/284.1, 284.2, 130, 135, 281, 280.5, 589.1

(56) References Cited

U.S. PATENT DOCUMENTS

| 3,117,727 A | * | 1/1964 | Pollock et al. | ............ 239/284.2 |
| 3,574,337 A | * | 4/1971 | Edwards et al. | ......... 239/284.2 |
| 3,719,819 A | * | 3/1973 | Lowell | .................. 15/250.002 |
| 4,463,904 A | * | 8/1984 | Bray | ....................... 239/284.1 |
| 5,269,464 A | * | 12/1993 | Epple et al. | ............. 239/284.2 |

FOREIGN PATENT DOCUMENTS

| DE | 3842375 | * | 7/1989 | ............ 15/250.002 |
| DE | 4426051 | | 1/1996 | |
| DE | 4439445 | | 5/1996 | |
| FR | 2377911 | | 8/1978 | |
| FR | 2605906 | * | 5/1988 | ............ 15/250.002 |
| FR | 2646801 | | 11/1990 | |
| FR | 2671773 | * | 7/1992 | ............ 15/250.002 |
| FR | 2682658 | | 4/1993 | |
| FR | 2709715 | | 3/1995 | |
| GB | 2026851 | | 2/1980 | |
| GB | 2223424 | | 4/1990 | |

OTHER PUBLICATIONS

Patent Abstracts of Japan, vol. 011, No. 120 (M–580) Apr. 15, 1987 & JP 61 261151 A (Nippon Soken Inc), Nov. 19, 1986 (Nippon Denso Co LTD).

* cited by examiner

Primary Examiner—Gary K. Graham
(74) Attorney, Agent, or Firm—Martin A. Farber (57) ABSTRACT

A shield cleaning system, operating solely by spraying with washing fluid, for shields (2) of an automobile light has a plurality of washing nozzles (12–14) which are arranged on a washing arm (6) pivotable about a pivot axis (7) and which are located opposite and at a short distance from the shield (2) and together spray a part region of the shield (2) with washing fluid. The washing nozzles (12–14) are guided by the washing arm (6) over that region of the shield (2) which is to be cleaned.

14 Claims, 5 Drawing Sheets

HEADLIGHT CLEANING SYSTEM OPERATING EXCLUSIVELY BY SPRAYING WITH WASHING LIQUID

FIELD AND BACKGROUND OF THE INVENTION

The invention relates to a shield cleaning system, operating solely by spraying with washing fluid, for shields of an automobile, in particular for shields of automobile lights, with a washing arm movable over and at a distance from the shield by a motor and with a washing nozzle which is arranged on the washing arm and which is provided for spraying washing fluid onto the shield.

In a known shield cleaning system, the washing nozzle is moved by the washing arm from a position of rest next to the shield into an operating position in a central position above the shield. The shield cleaning system is thereby essentially independent of the external design of the automobile. However, since the washing nozzle also has to clean the edge regions of the shield from the central position above the latter, in the operating position the washing nozzle is at a long distance from the shield. The washing fluid jet may consequently be deflected by the relative wind. In order to clean the shield, therefore, the known shield cleaning system requires particularly high pressure at the washing nozzle and a large quantity of washing fluid. The known shield cleaning system therefore has a very high-powered washing fluid pump and a washing fluid container of large volume. This leads, however, to a high outlay in terms of construction and to high production costs of the shield cleaning system.

Furthermore, a washing nozzle has become known, which has a swirl chamber with an axial and a tangential inlet. A conical and a central washing fluid jet can thereby be generated alternately. The dirt adhering to the shield is consequently flushed from inside outward to the shield edge, as a result of which a particularly good cleaning action is to be achieved. Since, in this case too, the washing nozzle is located in a central position above the shield, a very high pressure at the washing nozzle and a large quantity of washing fluid are also required in this design, particularly in order to clean the edge regions of the screen.

It would be conceivable to improve the cleaning action by means of a shield wiper which wipes away the dirt released by the washing fluid. This is not possible, however, particularly with regard to automobile light shields produced from transparent plastic, since they may be scratched by the screen wiper. In future automobiles, for example, video cameras could well also be used, the shields of which would likewise have to be protected from being scratched by a screen wiper.

SUMMARY OF THE INVENTION

The object on which the invention is based is to provide a shield cleaning system of the initially mentioned type, in such a way that, with a particularly small quantity of washing fluid, it cleans the shield thoroughly and without the risk of the shield being scratched.

This object is solved, according to the invention, in that the washing nozzle is provided for spraying a part region of the shield and can be moved by the washing arm over that region of the shield which is to be cleaned.

Since the washing nozzle of the shield cleaning system according to the invention sprays only a part region of the shield with washing fluid, said washing nozzle may be arranged at a substantially shorter distance above the shield than the washing nozzle of the known shield cleaning system. Since the washing nozzle is at a short distance from the shield, the washing fluid jet is deflected only insignificantly by the relative wind. As a result, dirt adhering to the shield is flushed away according to the movement of the washing arm, so that the shield is cleaned particularly thoroughly. Moreover, only a particularly small washing fluid pump and a very small washing fluid container are required, since losses of washing fluid are kept particularly low due to the short distance of the washing nozzle from the shield. The shield cleaning system according to the invention can therefore be produced particularly cost-effectively and has particularly low washing fluid consumption. Furthermore, scratching of the shield is ruled out because it is cleaned solely by the washing fluid jet. Shields of any size can be cleaned by arranging a plurality of washing nozzles which overlap slightly in the spray region.

According to an advantageous development of the invention, the shield cleaning system according to the invention has a particularly high cleaning action, along with a particularly low washing fluid consumption, if the washing nozzle is designed as a fluidic nozzle with a washing fluid jet oscillating essentially transversely to the direction of movement of the washing arm. Even if the pressure in the washing fluid line is relatively low, such fluidic nozzles generate a sharp punctiform washing fluid jet which constantly oscillates laterally through an intended angle. As a result, the washing nozzle has a striplike or elliptic spray region. The washing fluid jet is guided over the entire shield by means of the movement of the washing nozzle by the washing arm.

According to another advantageous development of the invention, the washing arm is particularly simple in terms of construction if it is of tubular design for receiving a washing fluid duct leading to a plurality of washing nozzles and has a connection for a washing fluid line.

If there is a plurality of washing nozzles connected to a common washing fluid duct, all the washing nozzles receive the same quantity of washing fluid if, according to another advantageous development of the invention, the washing fluid duct has a tapering inner contour, as seen from the connection of the washing fluid line.

According to another advantageous development of the invention, washing fluid is constantly present in the vicinity of the washing nozzles if a nonreturn valve is arranged in the washing fluid duct. This design keeps a delay in cleaning the shield after the shield cleaning system has been switched on particularly short.

According to another advantageous development of the invention, the washing nozzles can be prevented in a simple way from freezing up if a heating element is arranged in the washing fluid duct and/or at the washing nozzles.

According to another advantageous development of the invention, the shield cleaning system can be produced particularly cost-effectively if the washing arm is mounted pivotably about a pivot axis.

In known shield cleaning systems irregularly shaped screens can be cleaned only partially, since, in this case, the washing nozzle sprays the edges of the shields only inadequately with washing fluid. However, according to another advantageous development of the invention, shields of irregular shape are cleaned virtually completely if they have means for adjusting the distance of the washing nozzle from the shield during the movement of said washing nozzle. By virtue of this design, the washing nozzle is at a particularly long distance from the shield when a wide region of the shield is to be sprayed. Since the spray region, of fluidic nozzles in particular, widens with an increasing distance from the washing nozzle, the shield is reliably cleaned as far as and into its edge regions.

According to another advantageous development of the invention, the means for increasing the distance of the washing nozzle from the shield are particularly simple in terms of construction if the washing arm has a yoke mounted pivotably in a lateral region of the shield and, when in the basic position, at least partially surrounding the shield.

According to another advantageous development of the invention, the washing arm is particularly stable if it has a yoke mounted on two opposite sides of the shield. By virtue of this design, for example, round or elliptic shields can be cleaned in a particularly simple way, since, in this case, the distance of the washing nozzle from the shield and, consequently, the width of the sprayed region change uniformly with the pivot angle of the washing arm. Oval shields are cleaned completely by means of a plurality of washing nozzles arranged next to one another, without washing fluid being sprayed alongside the shield.

According to another advantageous development of the invention, the washing nozzle always sprays perpendicularly onto the shield if the washing arm has two yokes running parallel and the washing nozzle is mounted pivotably relative to each of the yokes.

According to an advantageous development of the invention, a lateral boundary of the spray region of the washing nozzle moved at a variable distance over the shield can be set in a simple way if the washing nozzle is inclined transversely to its direction of movement.

Particularly in the case of convexly curved shields of automobile lights, the intended distance of the washing nozzles from the shield can often be maintained by means of the pivotably mounted washing arm. According to another advantageous development of the invention, even in the case of convexly curved shields, the washing nozzles are at the intended distance from the shield if the washing arm has a push rod mounted so as to be longitudinally displaceable and shaped according to the contour of the shield.

According to another advantageous development of the invention, the washing nozzles are reliably protected from damage if, in a basic position, the washing nozzles are countersunk in a recess of an automobile component adjacent to the shield.

According to another advantageous development of the invention, soiling of the washing nozzles countersunk in the recess can be reliably avoided if the washing arm has a cover closing the recess in the basic position. Furthermore, by virtue of this design, the shield cleaning system has virtually no influence on the automobile's air resistance. For visual reasons, the cover may be lacquered in the color of the automobile component adjacent to the shield.

According to another advantageous development, the washing arm can be produced particularly cost-effectively if it is produced from plastic by the injection molding method. If the washing arm has a cover for the recess, the cover may, for example, be colored in the color of the automobile component adjacent to the shield.

The shield cleaning system according to the invention is fitted in a particularly simple way if a guide of the push rod or a mounting of the washing arm is produced in one piece with a housing of the automobile light.

Experience has shown that shield cleaning systems have a considerable influence on the visual appearance of the automobile. A particular advantage due to the fact that a washing arm is visible only during the cleaning operation is afforded if the washing arm is designed as a component shaped according to the contour of a body element and is arranged so as to be movable out of said body element. This body element is expediently located in a region directly in front of the shield.

A high proportion of already prefabricated and preassembled components is particularly profitable in automobile production. A particular embodiment of the shield cleaning system according to the invention can be fitted by a supplier, independently of the automobile, if the body element is a fender of an automobile.

Conventional shield cleaning systems often have the disadvantage that, in order to be used, they first have to be moved into an operating position and only thereafter can the actual washing operation commence. The washing arm is already in a position for operation if, according to a further embodiment according to the invention, the washing nozzle is arranged on the top side of the component.

A shield cleaning system of the type mentioned should operate reliably precisely under adverse environmental conditions. In the case of washing arms of the conventional type which are exposed, the washing nozzle may be covered, for example, with a layer of snow in winter, thereby considerably restricting the action of such washing nozzle arrangements. The shield cleaning system is largely protected against environmental influences if the washing nozzle is arranged on the underside of the component. In this version, the washing nozzle, when in the position of rest, remains inside the body elements surrounding it and is therefore visible only in the operating position.

The shield cleaning system according to the invention can be produced particularly economically if the fitting outlay is diminished by a reduction in the components. A corresponding embodiment, in which the component is designed in one piece with the washing nozzle, can be achieved if the component is designed as a washing nozzle.

The component according to the invention, movable out of the contour of a body element, opposes little resistance to the air flow, even at high speeds, and can be arranged in a particularly simple way if the component is pivotable about a joint running transversely to the longitudinal axis of the automobile.

Arranging a joint for the component involves a high outlay in terms of construction, depending on the nature of the surface. Another embodiment of the invention, which is particularly advantageous for this purpose, therefore dispenses with a joint. Such an embodiment can be implemented particularly effectively, even in the case of highly convexly curved surfaces and difficult conditions of space, if the component can be moved out of the contour of the body element in parallel by means of the motor.

In addition to lightweight construction, it is of primary importance in modern automobile manufacturing, to cut back on additional structural elements. The drive of the washing arm can be achieved in a simple way if, according to another development of the invention, the motor for moving the washing arm can be driven by the washing fluid. This motor consists, for example, of a piston which has a connected push rod and which is moved slowly out of a position of rest as far as maximum deflection by the pressure of the washing fluid conveyed by means of a washing fluid pump. In this case, the speed of movement can be adapted, for example, by means of a throttle. It would also be possible, however, to drive the piston by means of a vacuum which is generated by the flow of washing fluid.

According to another advantageous development of the invention, the shield cleaning system has particularly low washing fluid consumption, along with a particularly high cleaning action, if it has a control device for conveying the washing fluid to the washing nozzles at the start and end of an intended time interval. By virtue of this design, dirt located on the shield is first softened and is subsequently flushed away.

Present-day automobiles have a shield cleaning system with a washing fluid pump for conveying washing fluid to a front shield. The shield cleaning system according to the invention necessitates a particularly low outlay in terms of construction if the washing fluid pump is designed for selectively conveying washing fluid in two directions, the washing fluid being capable of being conveyed in one direction to the front shield and in the other direction to the shields of automobile lights. The front shield or the shields of the automobile lights can thereby be cleaned in succession.

BRIEF DESCRIPTION OF THE DRAWINGS

The invention permits numerous embodiments. In order to makes its basic principle even clearer, several of these are illustrated in the drawing and are described below. In the drawing.

DETAILED DESCRIPTION OF THE PREFERRED EMBODIMENTS

Figure 1:
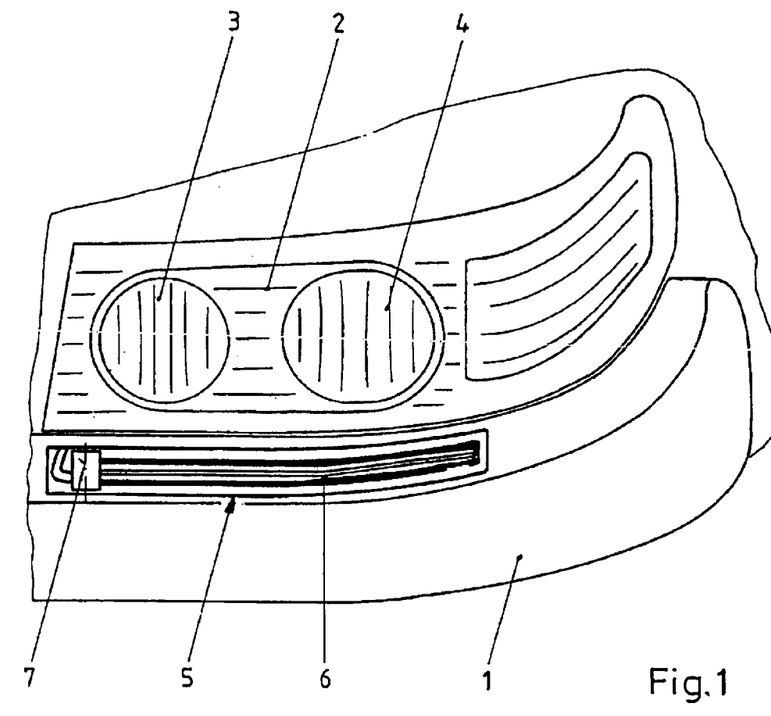
FIG. 1 shows a washing arm of a shield cleaning system according to the invention, together with adjacent components of an automobile.

FIG. 1 shows a perspective illustration of a front left region of an automobile with a fender 1 and of two automobile lights 3, 4 arranged behind a common shield 2 and designed as front headlamps. The fender 1 has a recess 5 which is located directly below the shield 2 and in which a washing arm 6 for cleaning the shield 2 is mounted pivotably about a pivot axis 7. In the position depicted, the washing arm 6 is countersunk in the recess 5.

Figure 2:
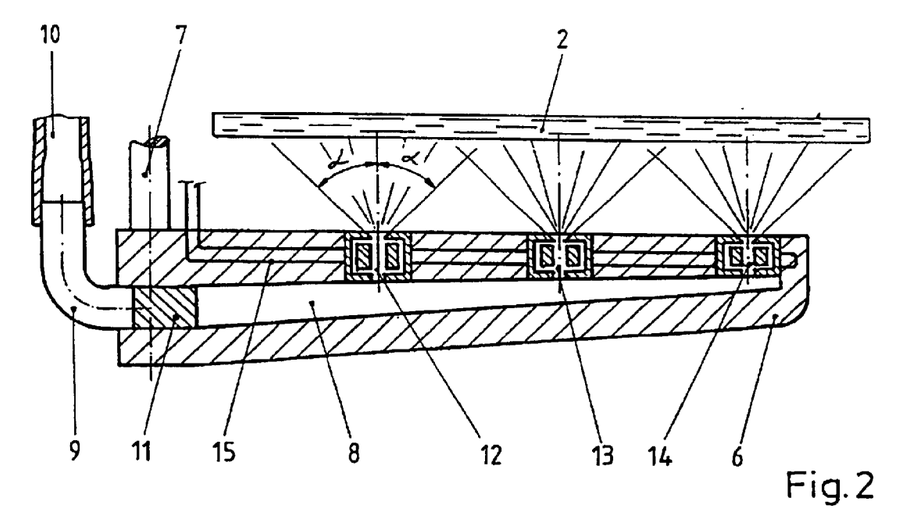
FIG. 2 shows the washing arm from FIG. 1 in longitudinal section.

In order to clean the shield 2, the washing arm 6 is pivoted out of the recess 5 and over the shield 2. FIG. 2 shows a sectional illustration of the washing arm 6, located above the shield 2, when the latter is being cleaned. It can be seen clearly that the washing arm 6 is of tubular design for receiving a washing fluid duct 8 and has a connection 9 for a washing fluid line 10. The washing fluid duct 8 has a taper which is continuous from the connection 9 of the washing fluid line 10. Arranged in the washing fluid duct 8 is a nonreturn valve 11 which prevents air from penetrating into the washing fluid line 10. Washing fluid passes through the washing fluid duct 8 to a plurality of washing nozzles 12–14 directed onto the shield 2. Furthermore, the washing fluid duct 8 has a resistance wire 15 in the region of the washing nozzles 12–14. The washing nozzles 12–14 are designed as so-called fluidic nozzles and generate a washing fluid jet oscillating laterally through an angle $\alpha$. As a result, the washing nozzles 12–14 each have a striplike spray region, in each case two adjacent spray regions overlapping one another slightly. When the washing arm 6 pivots about the pivot axis 7 and the washing nozzles 12–14 spray at the same time, the washing fluid jet is guided over the entire shield 2.

Figure 3A:
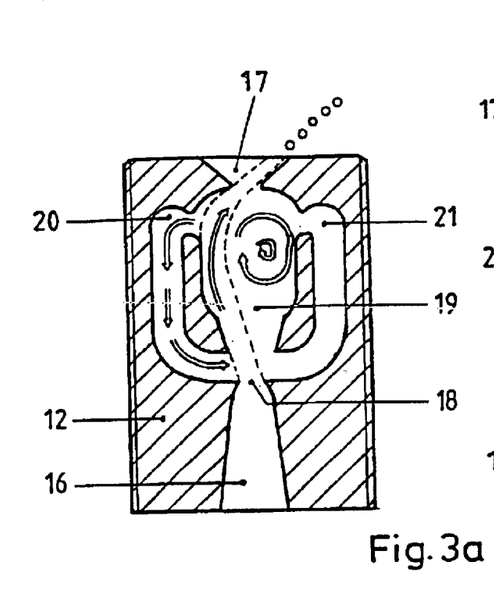
FIGS. 3a and 3b show a fluidic nozzle from FIG. 2 in sectional illustrations, with flows depicted in them.
Figure 3B:
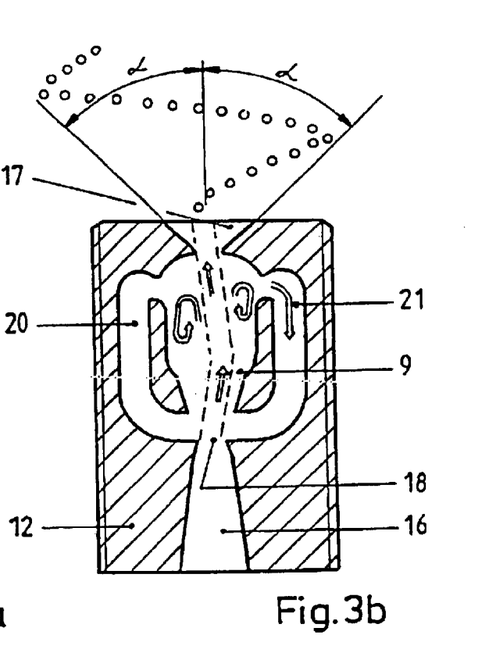

One of the washing nozzles 12–14 from FIG. 2, which are designed as fluidic nozzles, is illustrated in section in FIGS. 3a and 3b. The washing nozzle 12 has an inlet duct 16, connected to the washing fluid duct 8 illustrated in FIG. 2, and a funnel-shaped outlet 17. Arranged at the end of the inlet duct 16 is a nozzle 18 which focuses the washing fluid, flowing through the inlet duct 16 to a narrow main flow and feeds it to a swirl chamber 19. The flow-side end of the swirl chamber 19 is connected by means of two return ducts 20, 21 to the inlet region of the swirl chamber 19. The main flow first enters the swirl chamber 19 and generates a circulation flow there, with the result that the main flow is deflected toward one side. Washing fluid flows through the return duct 20, located opposite the circulation flow, into the inlet region of the swirl chamber 19 and forces the main flow to the other side. The washing fluid jet emerging from the outlet 17 thereby oscillates constantly through the angle $\alpha$.

Figure 4:
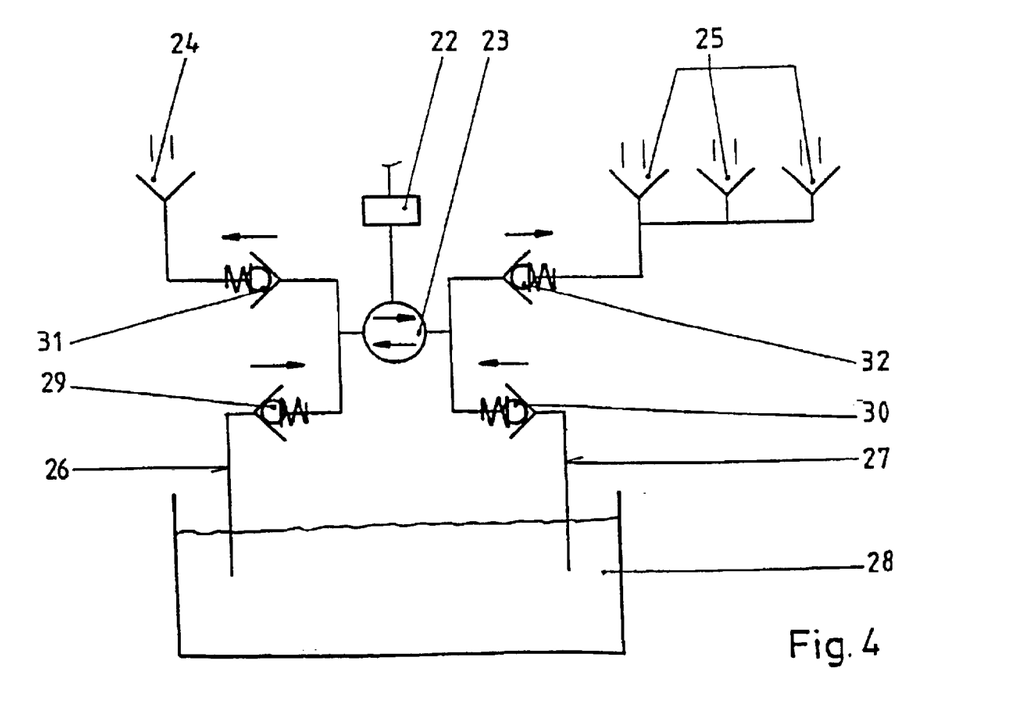
FIG. 4 shows a circuit diagram of a shield cleaning system according to the invention.

FIG. 4 shows a circuit diagram of a shield cleaning system with a washing fluid pump 23 which is activated by a control device 22 and which is designed for selective conveying in both directions. A washing nozzle 24 for an automobile front shield, not illustrated, and a plurality of washing nozzles 25 provided for cleaning automobile light shields, not illustrated either, are connected to the washing fluid pump 23. Two washing fluid lines 26, 27 lead from the washing fluid pump 23 to a washing fluid container 28. Nonreturn valves 29–32 are arranged in each case upstream of the washing nozzles 24, 25 and in the washing fluid lines 26, 27 leading to the washing fluid container 28. For the sake of clarity, the directions of flow of the washing fluid are identified by arrows. Depending on the direction of rotation of the washing fluid pump 23, the washing fluid is conveyed selectively to the washing nozzle 24 of the front shield or to the washing nozzles 25 of the shields of the automobile lights.

Figure 5:
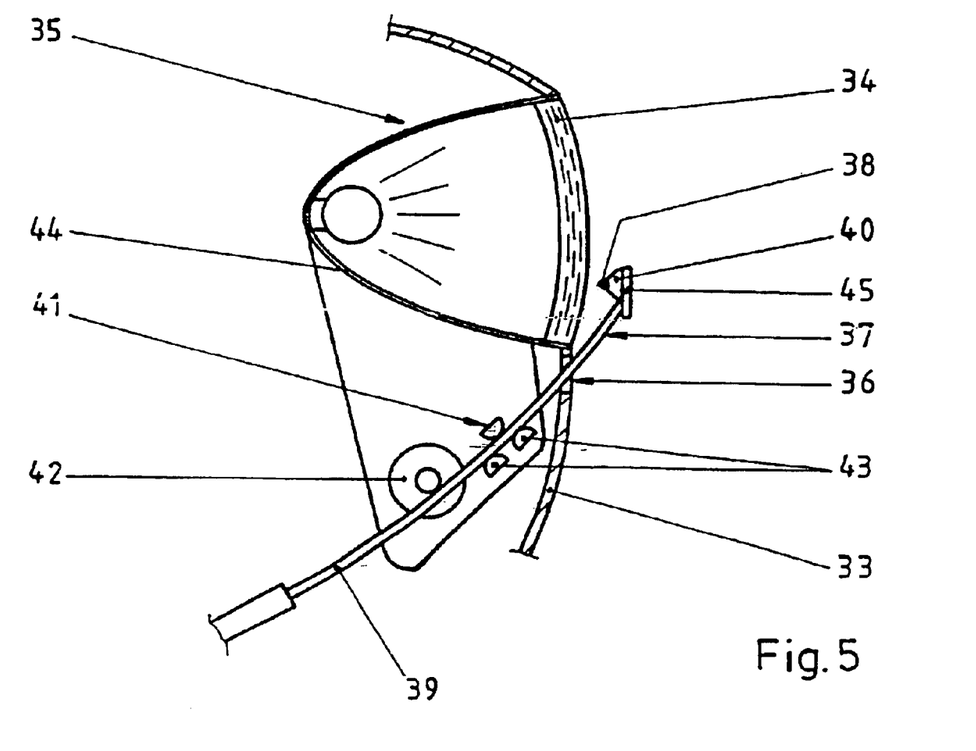
FIG. 5 shows a sectional illustration of another embodiment of a washing arm arranged in front of a shield of a headlamp.

FIG. 5 shows a sectional illustration of an automobile light 35 arranged in a body panel 33 of an automobile and designed as a headlamp. The automobile light 35 has a convexly curved shield 34. The body panel 33 has a recess 36, through which a washing arm 37 of a shield cleaning system is led. Washing nozzles 38, which are located opposite and at a short distance from the shield 34, are arranged on the washing arm.

Figure 6:
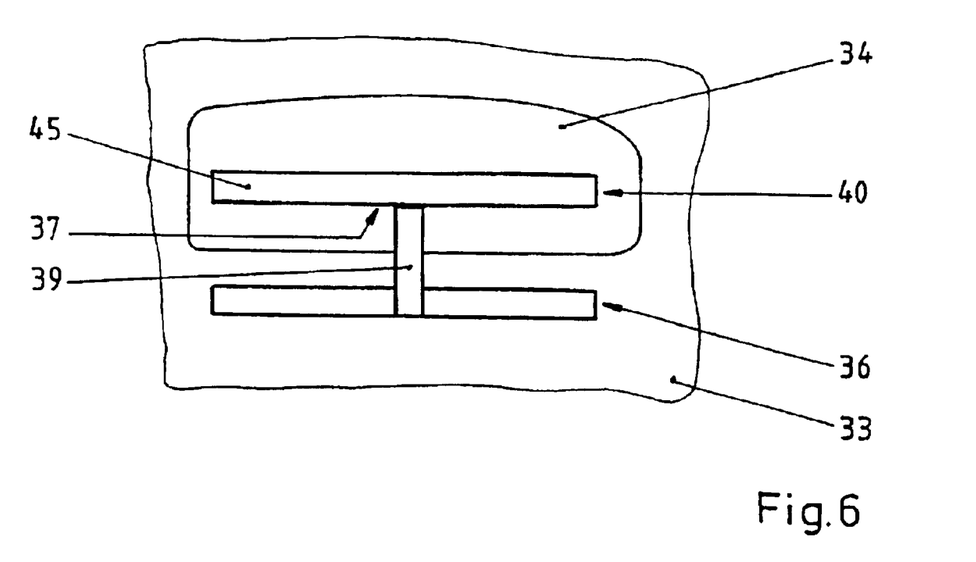
FIG. 6 shows the washing arm together with the shield from FIG. 5, as seen from the front.

FIG. 6 shows that the washing arm 37 is of T-shaped design and has a push rod 39 and, arranged transversely to the latter, a nozzle carrier 40 having a plurality of washing nozzles 38 illustrated in FIG. 5 The push rod 39 has a bend corresponding to the convexity of the shield 34 and is mounted so as to be longitudinally displaceable in a guide 41. The push rod 39 is driven by an electric motor 42. The guide 41 of the push rod 39 consists of guiding elements 43 and is produced in one piece with a housing 44 of the automobile light 35. The nozzle carrier 40 has, on its side facing away from the shield 34, a cover 45 which is provided for closing the recess 36 of the body panel 33 when the shield washing system is in a basic position.

Figure 7:
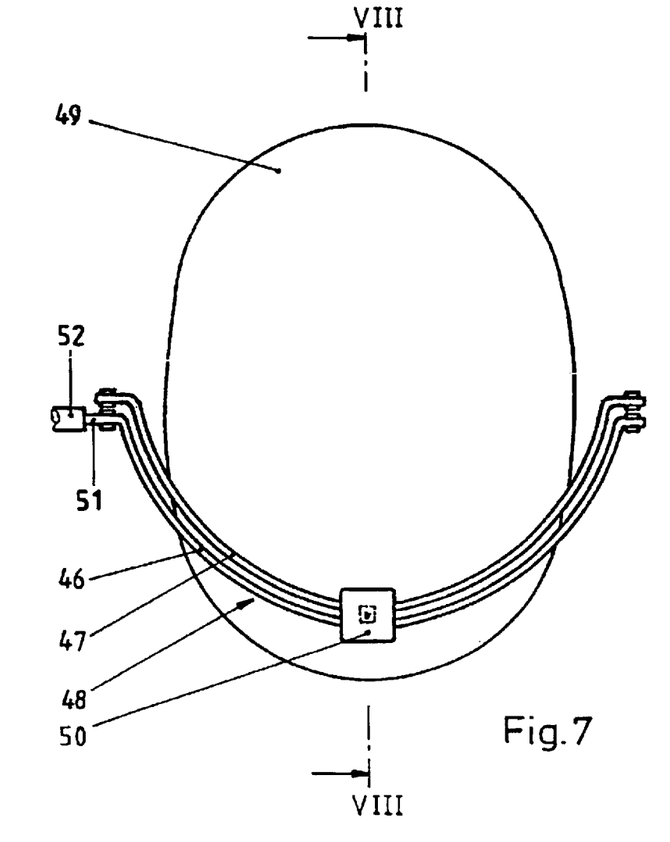
FIG. 7 shows a shield cleaning system with a washing nozzle arranged on two yokes.

FIG. 7 illustrates a shield cleaning system with a washing arm 48 having two yokes 46, 47 arranged parallel to one another. The yokes 46, 47 are in each case mounted pivotably on two opposite sides of a shield 49 and are driven, for example, electromotively. A washing nozzle 50 is arranged in the middle of the washing arm 48. The left half of one of the yokes 46 is of tubular design and has a connection 51 for a washing fluid line 52. The washing nozzle 50 is thereby supplied with washing fluid.

Figure 8:
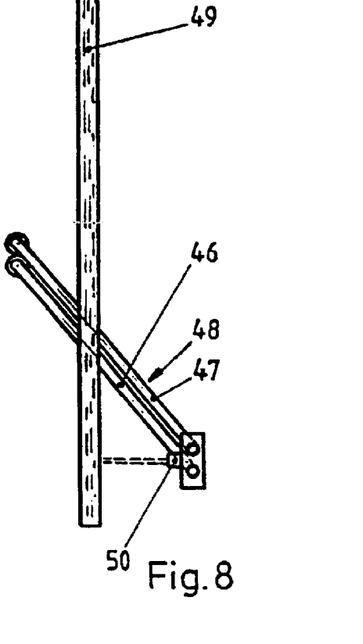
FIG. 8 shows a sectional illustration of the shield cleaning system from FIG. 7 along the line VIII—VIII.

FIG. 8 shows that the washing nozzle 50 changes its distance from the shield 49 during its movement. This distance is greatest when the washing nozzle 50 is in a middle position above the shield 49, and decreases above the edge regions of the shield 49. The washing nozzle 50 is designed as a fluidic nozzle illustrated in FIGS. 3a and 3b. Furthermore, the washing nozzle 50 is mounted pivotably relative to the yokes 46, 47. The washing fluid is thereby sprayed perpendicularly onto the shield 49 by the washing nozzle 50 in any position. The washing nozzle 50 may, of course, also be inclined slightly in the direction of movement, so that dirt adhering to the shield 49 is flushed away in one direction.

Figure 9:
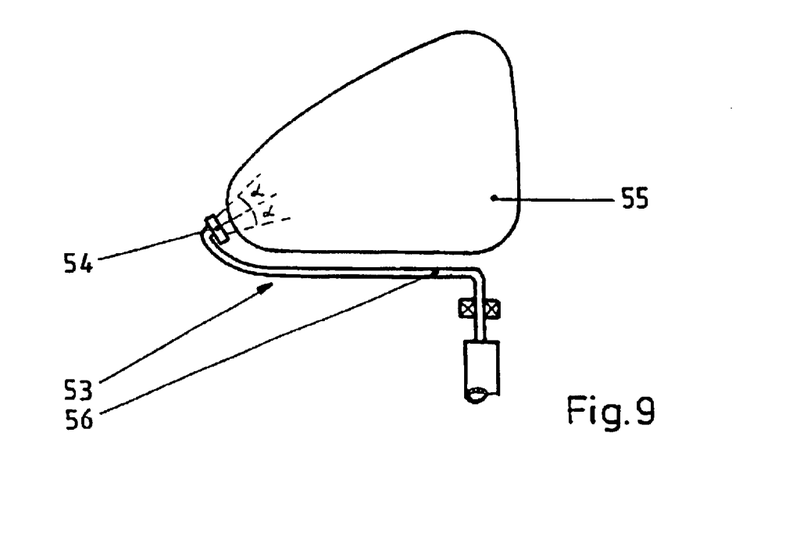
FIG. 9 shows a diagrammatic illustration of another embodiment of the shield cleaning system according to the invention.

FIG. 9 illustrates a shield cleaning system with a washing nozzle 54 arranged on a washing arm 53. The washing arm 53 is mounted pivotably in a lateral region of a shield 55 and has a yoke 56 partially surrounding the shield 55. The washing nozzle 54 is likewise designed as a fluidic nozzle illustrated in FIGS. 3a and 3b and is arranged with a slight inclination transverse to its direction of movement. A spray region adapted to the shape of the shield 55 is thereby generated during the movement of the washing nozzle 54. The washing arm 53 can be pivoted through an angular range of 90° by an electric motor, which is not illustrated.

Figure 10:
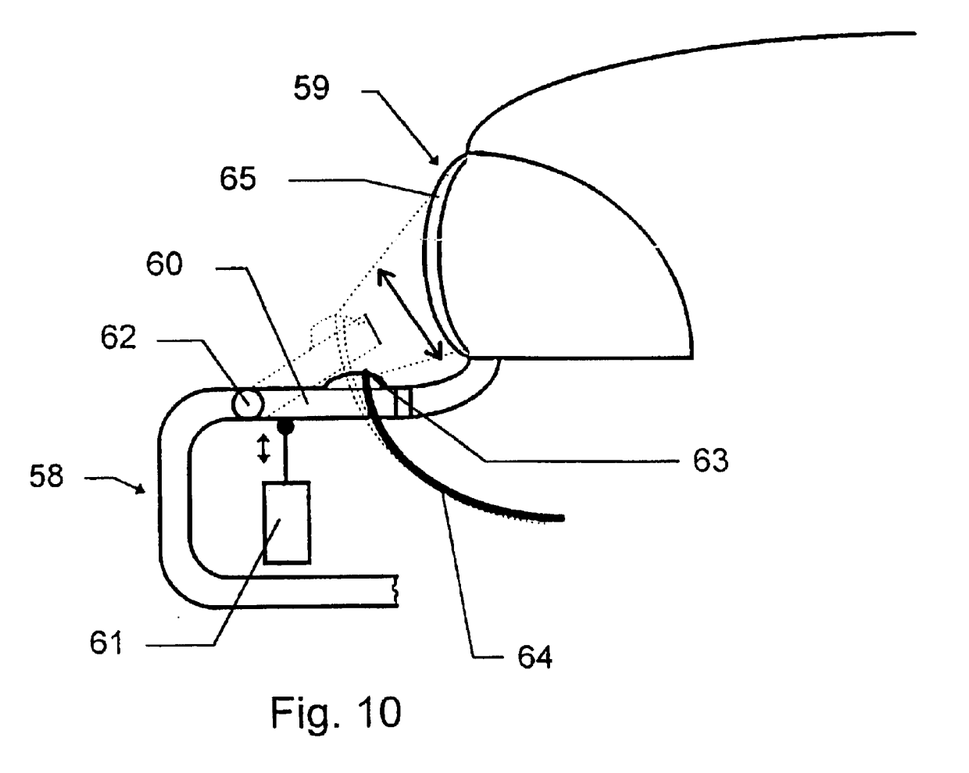
FIG. 10 shows a diagrammatic illustration of another embodiment of a shield cleaning system according to the invention.

FIG. 10 shows a sectional illustration of a body element 58 (fender) designed as a fender, with an adjacent automobile light 59. In this embodiment, the washing arm provided is a component 60 which is designed as a flap and which can be pivoted about a joint 62 by means of a motor 61. The component has, on its top side, a washing nozzle 63 with a washing fluid line 64 connected to the latter. The washing jet from the washing nozzle 63 can be steered by means of the movement of the component 60 from a lower position, in which the jet is directed onto the lower edge of a shield 65 of the automobile light 59, into an upper position, in which the jet is directed onto the upper edge of the shield 65 of the automobile light 59.

It is not shown that, even when the nozzle 63 is spraying, the component 60, instead of being swung up, can move parallel to itself out of the contour of the body element 58 designed as a fender.

We claim:

1. A shield cleaning System, operating by spraying with washing fluid, for shields of an automobile, comprising:
    a motor, and a washing arm movable over and at a distance from the shield by said motor, and a push rod interconnecting the motor with the washing arm for displacing the washing arm in a longitudinal direction of the push rod, the washing arm extending transversely of the direction of longitudinal displacement;
    at least one fluidic washing nozzle arranged on the washing arm for spraying washing fluid onto the shield;
    wherein the washing nozzle is movable by the washing arm over a region of the shield which is to be cleaned, wherein the washing nozzle has an outlet opening facing said shield, and the washing fluid is sprayable on at least portions of the shield immediately during movement of the washing arm from a basic position of the washing arm; and
    wherein the fluidic washing nozzle has a washing fluid jet oscillating essentially transversely to the direction of movement of the washing arm, and a shape of the push rod corresponds to a contour of the shield.

2. The shield cleaning system a claimed in claim 1, wherein the washing arm (6) is of tubular form for receiving a washing fluid duct (8) leading to a plurality of washing fluid line (10).

3. The shield cleaning system a claimed in claim 2, wherein a nonreturn valve (11) is arranged in the washing fluid duct (8).

4. The shield cleaning system as claimed in claim 2, wherein a heating element comprising a resistance wire 15 is arranged in the washing fluid duct (8).

5. The shield cleaning system as claimed in claim 2, wherein a heating element comprising a resistance wire 15, is arranged at the washing nozzles.

6. The shield cleaning system as claimed in claim 1, wherein, the basic position, the washing nozzles (12–14, 38) are countersunk in a recess (5, 36) of an automobile component adjacent to the shield (2, 34).

7. The shield cleaning system as claimed in claim 6, wherein the washing arm (37) has a cover (45) closing the recess (36) in the basic position.

8. The shield cleaning system as claimed in claim 1, wherein the washing arm (6, 37, 48, 53) is injection molded plastic.

9. The shield cleaning system as claimed in claim 1, wherein a guide (41) of the push red (39) or a mounting of the washing arm is in one piece with a housing (44) of the automobile lights (35).

10. The shield cleaning system as claimed in claim 1, wherein there is a control device (22) for conveying the washing fluid to the washing nozzles (24, 25) at the start and end of an intended time interval.

11. The shield cleaning system as claimed in claim 1, with a washing fluid pump for conveying washing fluid to a front shield of the automobile, wherein the washing fluid pump (23) selectively conveys washing fluid in two directions, the washing fluid being capable of being conveyed in one direction to the front shield and in the other direction to other shields (2, 34, 65) of automobile lights (3, 4, 35).

12. The shield cleaning system as claimed in claim 1, wherein distance of the nozzle from the shield changes during movement of the washing arm and the nozzle is closest to the shield at an edge of the shield.

13. The shield cleaning system, operating solely by spraying with washing fluid, for shields of an automobile, comprising
    a motor,
    a washing arm component (60) movable over and at a distance from the shield by said motor, and a washing nozzle arranged on the washing arm component for spraying washing fluid onto the shield, wherein the washing nozzle has an outlet opening facing said shield in and defining all spraying positions of the nozzle and that of the washing arm component immediately during movement of the washing arm component from a basic position, the movement retaining the washing arm component parallel to the basic position, and the washing nozzle sprays fluid on at least portions of the shield concurrently with said movement of the washing arm component, and wherein the motor (61) for moving the washing arm Component (60) is a motor (61) driven by the washing fluid, wherein the washing nozzle (12–14, 25, 38, 50, 54, 63) is a fluidic nozzle with a washing fluid jet oscillating essentially transversely to the direction of movement of the washing arm (6, 37, 48, 53), the fluidic nozzle comprising a swirl chamber with return ducts to an inlet region of the swirl chamber to induce oscillation of an emerging fluid washing jet.

14. The shield cleaning system as claimed in claim 1, wherein distance of the nozzle from the shield changes during movement of the washing arm component and the nozzle is closest to the shield at an edge of the shield.

* * * * *